US012113306B2

(12) United States Patent
Li et al.

(10) Patent No.: US 12,113,306 B2
(45) Date of Patent: Oct. 8, 2024

(54) DUAL-BAND ANTENNA ARRAY WITH BOTH FAN BEAM AND PENCIL BEAM

(71) Applicant: Chongqing University, Chongqing (CN)

(72) Inventors: Mei Li, Chongqing (CN); Lin Pu, Chongqing (CN); Ming-Chun Tang, Chongqing (CN); Lei Zhu, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 119 days.

(21) Appl. No.: 18/073,844

(22) Filed: Dec. 2, 2022

(65) Prior Publication Data

US 2023/0178897 A1 Jun. 8, 2023

(30) Foreign Application Priority Data

Dec. 2, 2021 (CN) ........................ 202111457639.9

(51) Int. Cl.
*H01Q 9/30* (2006.01)
*H01Q 19/20* (2006.01)

(52) U.S. Cl.
CPC ............... *H01Q 9/30* (2013.01); *H01Q 19/20* (2013.01)

(58) Field of Classification Search
CPC ............. H01Q 21/0075; H01Q 21/065; H01Q 21/062; H01Q 21/24; H01Q 9/0407
See application file for complete search history.

(56) References Cited

U.S. PATENT DOCUMENTS

| | | | | |
|---|---|---|---|---|
| 2021/0066817 A1* | 3/2021 | Tehran | ................. | H01Q 21/065 |
| 2023/0327338 A1* | 10/2023 | Minamitani | ........... | H01Q 9/065 343/727 |

FOREIGN PATENT DOCUMENTS

| | | | | | |
|---|---|---|---|---|---|
| CN | 105846110 A | * | 8/2016 | ............. | H01Q 17/00 |
| CN | 109638422 B | * | 2/2021 | ........... | H01Q 21/065 |

OTHER PUBLICATIONS

2013, IEEE Standard for Definitions of Terms for Antenna (Year: 2013).*

* cited by examiner

*Primary Examiner* — David E Lotter
*Assistant Examiner* — Aladdin Abdulbaki
(74) *Attorney, Agent, or Firm* — WENDEROTH, LIND & PONACK, L.L.P.

(57) ABSTRACT

The present disclosure relates to a dual-band antenna array with fan beam and pencil beam. The antenna comprises a substrate and an antenna array arranged on the surface of the substrate, a first antenna element and a second antenna element are cascaded in an x-axis direction by a filter phase-shift line so as to form a subarray. A pair of T-shaped monopoles are symmetrically placed along the x axis at a certain distance above and below each of the first and second antenna elements, respectively, and a rectangular slot is embedded in the upper edge of the second antenna element to achieve good impedance matching. The second antenna element generates a fan beam at one frequency point or frequency band to have the performance of a wide beam, and generates a pencil beam at another frequency point or frequency band to have the performance of a narrow beam.

4 Claims, 5 Drawing Sheets

DUAL-BAND ANTENNA ARRAY WITH BOTH FAN BEAM AND PENCIL BEAM

CROSS-REFERENCE TO RELATED APPLICATION

This patent application claims the benefit and priority of Chinese Patent Application No. 202111457639.9, filed with the China National Intellectual Property Administration on Dec. 2, 2021, the disclosure of which is incorporated by reference herein in its entirety as part of the present application.

TECHNICAL FIELD

The present disclosure belongs to the technical field of antennas, and relates to a dual-band antenna array with both fan beam and pencil beam.

BACKGROUND

The antenna has wide-beam characteristics when the radiation pattern is a fan beam, such that the antenna has wider signal coverage area, and is suitable for point-to-multiple communication. The antenna has narrow-beam characteristics when the radiation pattern thereof is pencil beam, and thus the antenna is better able to radiate in a specific direction to make the signal transmission distance farther under the same conditions, and is suitable for point-to-point communication. In a typical outdoor Ethernet bridging system, a directional antenna provides the fan beam and pencil beam simultaneously to satisfy the wide coverage of the signals at the same time, thus being suitable for operating distance requirements for the backhaul during point-to-multiple communication and point-to-point communication. Therefore, it is necessary to develop a dual-frequency antenna with a fan beam at one frequency point or frequency band and a pencil beam at another frequency point or frequency band.

To this end, a dual-band antenna array with both fan beam and pencil beam is provided to solve the problem above.

SUMMARY

To this end, an objective of the present disclosure is to provide a dual-band antenna array with both fan beam and pencil beam. In accordance with the structure, a subarray is composed of a first antenna element and a second antenna element which are cascaded in an x-axis direction by a filter phase-shift line, and then the subarrays are arranged in a y-axis direction to form a 2*4 array, finally achieving the purpose of having both the fan beam and the pencil beam. The developed antenna array is applied to an outdoor wireless Ethernet bridging system to achieve good point-to-point and point-to-multiple communication.

To achieve the objective above, the present disclosure provides the following technical solution:

In accordance with a dual-band antenna array with both fan beam and pencil beam, a distance d between two adjacent antenna subarrays is 49 mm, and the two adjacent antenna subarrays are arranged in the y-axis direction. Each of antenna subarrays is composed of a first antenna element and second antenna element which are cascaded in an x-axis direction by a filter phase-shift line.

Alternatively, the antenna subarray further comprises two pairs of T-shaped monopoles, that is, a first monopole 5 and a first metallic post 13 loaded in the monopole as well as a fifth monopole 9 and a fifth metallic post 17 loaded in the monopole are symmetrically placed at the upper side of a micro-strip patch 21, respectively.

Alternatively, the antenna subarray further comprises two pairs of T-shaped monopoles, that is, a second monopole 6 and a second metallic post 14 loaded in the monopole as well as a sixth monopole 10 and a sixth metallic post 18 loaded in the monopole are symmetrically placed at the lower side of the micro-strip patch 21, respectively.

Alternatively, the antenna subarray further comprises two pairs of T-shaped monopoles, that is, a third monopole 7 and a third metallic post 15 loaded in the monopole as well as a seventh monopole 11 and a seventh metallic post 19 loaded in the monopole are symmetrically placed at the upper side of a micro-strip patch 22 in the second antenna element.

Alternatively, the antenna subarray further comprises two pairs of T-shaped monopoles, that is, a fourth monopole 8 and a fourth metallic post 16 loaded in the monopole as well as an eighth monopole 12 and an eighth metallic post 20 loaded in the monopole are symmetrically placed at the lower side of the micro-strip patch 22 in the second antenna element. A slot 23 etched in the second antenna element is etched on the upper edge of the micro-strip patch 22 in the second antenna element.

Alternatively, the filter phase-shift line 24 is formed by bending and connecting seven stubs.

Alternatively, the substrate 1 is made of F4B (polytetrafluoroethylene), with a dielectric constant of 2.2, a loss tangent of 0.0009, and a thickness of 3 mm.

The present disclosure has the beneficial effects that:

(1) As the radiation pattern characteristics of wide beam can be provided at low frequency band, the dual-band antenna array is wide in wireless signal coverage range and suitable for point-to-multi communication.

(2) As the radiation pattern characteristics of narrow beam can be provided at high frequency band, the dual-band antenna array can transmit the signal towards a certain particular direction farther, and is suitable for point-to-point communication.

(3) As the radiation pattern characteristics of both wide and narrow beams can be provided at the same time, the dual-band antenna array can be applied to point-to-point and point-to-multiple communication at the same time, and is very suitable for outdoor wireless Ethernet bridging system.

Other advantages, objectives and features of the present disclosure will be set forth in part in the following description, and to some extent, will be apparent to those skilled in the art based on the study of the following, or can be taught from the practice of the present disclosure. The objectives and other advantages of the present disclosure may be realized and attained through the following specification.

BRIEF DESCRIPTION OF THE DRAWINGS

To make the objectives, technical solutions and advantages of the present disclosure more clearly, the present disclosure will be preferably described in detail below with reference to the accompanying drawings, in which.

Figure 1:
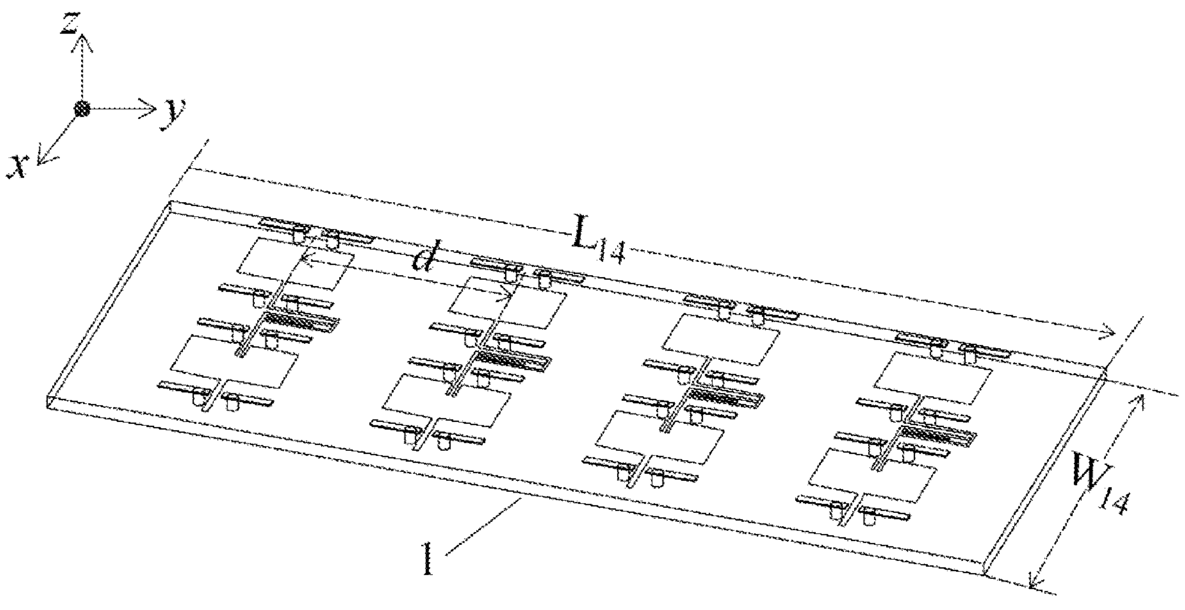
FIG. 1 is a three-dimensional view of a dual-band antenna array in accordance with the present disclosure.

In the drawings: 1—substrate; 2—first micro-strip line; 3—second micro-strip line; 4—substrate; 5—first monopole; 6—second monopole; 7—third monopole; 8—fourth monopole; 9—fifth monopole; 10—sixth monopole; 11—seventh monopole; 12—eighth monopole; 13—first metallic post loaded in monopole; 14—second metallic post loaded in monopole; 15—third metallic post loaded in monopole; 16—fourth metallic post loaded in monopole; 17—fifth metallic post loaded in monopole; 18—sixth metallic post loaded in monopole; 19—seventh metallic post loaded in monopole; 20—eighth metallic post loaded in monopole; 21—micro-strip patch in first antenna element; 22—micro-strip patch in second antenna element; 23—slot etched in second antenna element; 24—filter phase-shift line; 25—first stub; 26—second stub; 27—third stub; 28—fourth stub; 29—fifth stub; 30—sixth stub; 31—seventh stub.

DETAILED DESCRIPTION OF THE EMBODIMENTS

The embodiments of the present disclosure are described below by way of specific examples, and additional advantages and efficacy of the present disclosure will be readily apparent to those skilled in the art from the contents disclosed in the present description. The present disclosure may be further implemented or applied through other different specific embodiments, and various modifications or changes may also be made to each of the details in the present description based on different perspectives and applications without departing from the spirit of the present disclosure. It needs to be noted that the drawings provided in the embodiment only explain the basic conception of the present invention in an illustrative manner, and the following embodiments and the features in the embodiments may be combined with each other on a non-conflict basis.

The accompanying drawings are merely exemplarily illustrative, representing schematic diagrams but not physical diagrams, and shall not be regarded as limiting the present disclosure. In order to better describe the embodiments of the present disclosure, some elements in the accompanying drawings may be omitted, enlarged or reduced, and such elements in the accompanying drawings do not represent the real size of products. It should be understood by those skilled in the art that some well-known structures in the accompanying drawings and description thereof may be omitted.

Identical or similar reference numerals in the accompanying drawings in the embodiments of the present disclosure correspond to identical or similar elements. In the description of the present disclosure, it should be understood that the orientation or position relationship indicated by terms such as "up", "down", "left", "right", "vertical" and "horizontal" is an orientation or position relationship shown based on the accompanying drawings, which is merely used for conveniently describing the present disclosure and simplifying the description, rather than indicating or implying that the device or element must have a particular orientation or must be constructed and operated in a particular orientation. Therefore, the terms for describing the position relationships in the accompanying drawings are merely exemplarily illustrative and shall not be regarded as limiting the present disclosure. For those of ordinary skill in the art, the specific meanings of the above terms may be understood according to specific situations.

FIG. 1 is a three-dimensional view of a dual-band antenna array in accordance with the present disclosure. As shown in FIG. 1, in the embodiment, a distance d between adjacent subarrays in the dual-band antenna array is 46 mm to 52 mm, and a substrate 1 has a length $L_{14}$ of 200 mm to 220 mm and a width $W_{14}$ of 70 mm to 90 mm.

Figure 2:
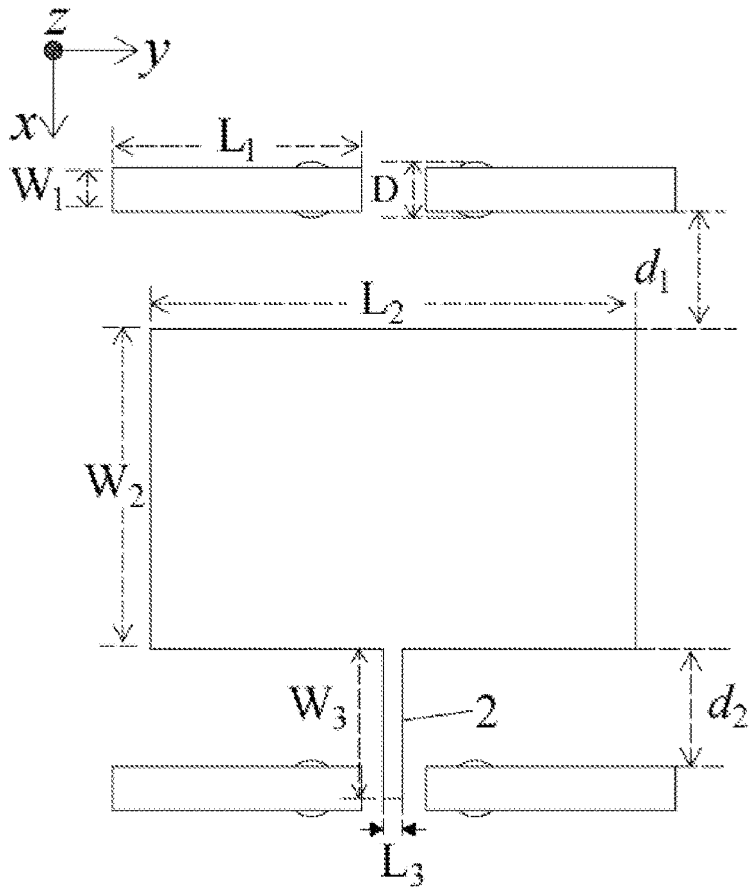
FIG. 2 is a front view of a first antenna element of a dual-band antenna subarray in accordance with the present disclosure.
Figure 3:
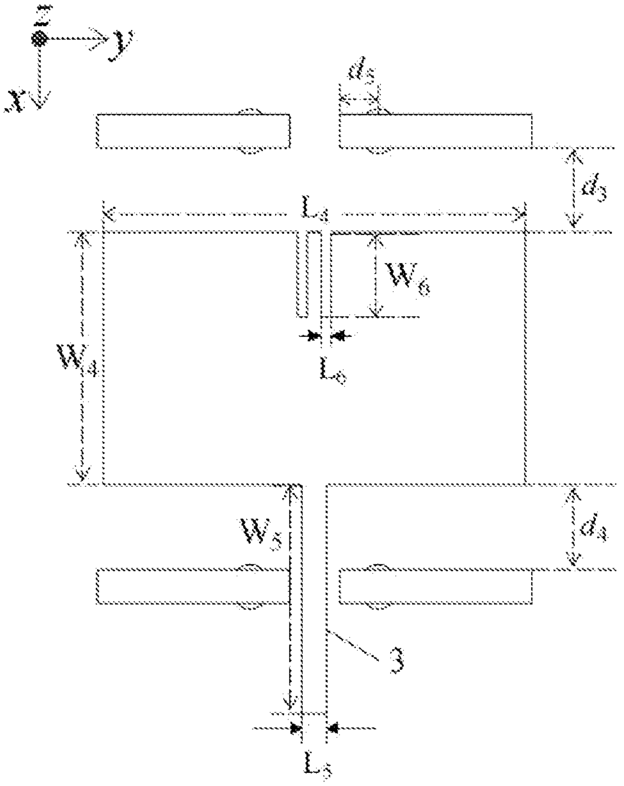
FIG. 3 is a front view of a second antenna element of a dual-band antenna subarray in accordance with the present disclosure.
Figure 4:
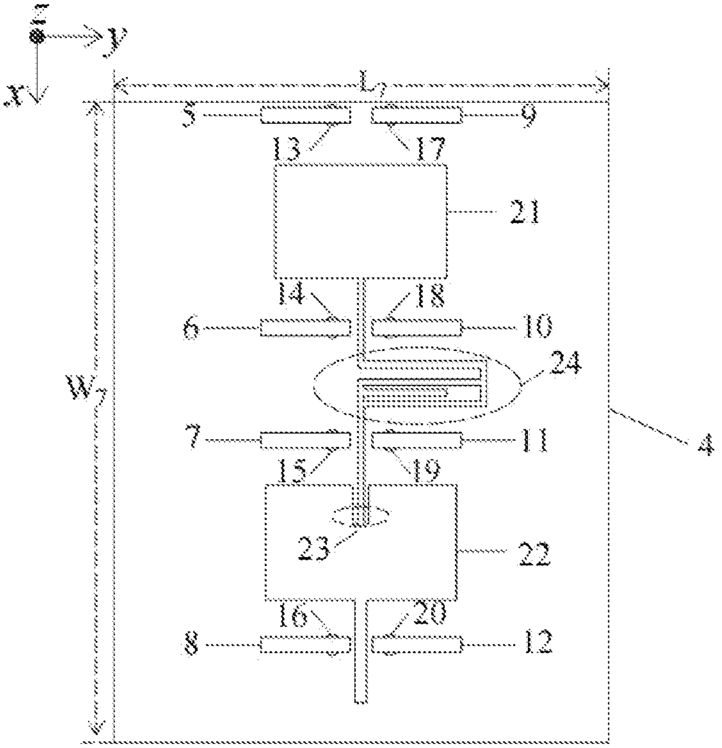
FIG. 4 is a front view of the dual-band antenna subarray in accordance with the present disclosure.
Figure 5:
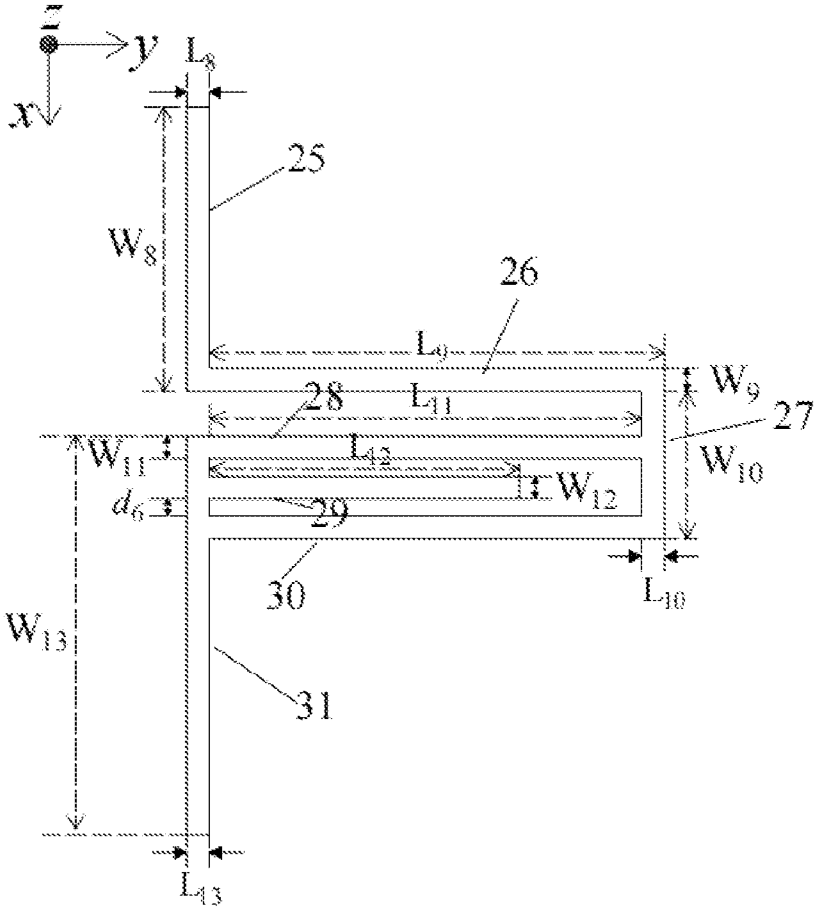
FIG. 5 is a front view of a filter phase-shift line in accordance with the present disclosure.

FIG. 2 is a front view of a first antenna element in the dual-band antenna subarray in accordance with the present disclosure. FIG. 3 is a front view of a second antenna element in the dual-band antenna subarray in accordance with the present disclosure. FIG. 4 is a front view of the dual-band antenna subarray in accordance with the present disclosure. FIG. 5 is a front view of a filter phase-shift line in accordance with the present disclosure.

As shown in FIG. 2, a pair of T-shaped monopoles are symmetrically loaded above and below a micro-strip patch 21 in the first antenna element, respectively.

Preferably, a first monopole 5 and a first metallic post 13 loaded in the monopole as well as a fifth monopole 9 and a fifth metallic post 17 loaded in the monopole are symmetrically placed above the micro-strip patch 21 in the first antenna element. A second monopole 6 and a second metallic post 14 loaded in the monopole as well as a sixth monopole 10 and a sixth metallic post 18 loaded in the monopole are symmetrically placed below the micro-strip patch 21 in the first antenna element. In the embodiment, the metallic posts have the same radius, where the radius R is 2.4 mm to 2.8 mm. The T-shaped monopoles have the same dimension, where the monopole has a length $L_1$ of 8.875 mm to 9.275 mm, and a width $W_1$ of 1.8 mm to 2.2 mm. A distance $d_1$ from the first monopole 5 and the first metallic post 13 loaded in the monopole as well as the fifth monopole 9 and the fifth metallic post 17 loaded in the monopole to the upper edge of the micro-strip patch 21 in the first antenna element is 4 mm to 6 mm. A distance $d_2$ from the second monopole 6 and the second metallic post 14 loaded in the monopole as well as the sixth monopole 10 and the sixth metallic post 18 loaded in the monopole to the lower edge of the micro-strip patch 21 in the first antenna element is 4 mm to 6 mm. The micro-strip patch 21 in the first antenna element has a length $L_2$ of 24 mm to 26 mm and a width $W_2$ of 13.43 mm to 15.43 mm. A second micro-strip line 3 has a length $L_3$ of 1.8 mm to 2.2 mm and a width $W_3$ of 6.8 mm to 7.2 mm.

As shown in FIG. 3, two pairs of T-shaped monopoles are symmetrically loaded above and below a micro-strip patch 22 in the second antenna element. A slot 23 etched in the second antenna element is etched on the upper edge of the micro-strip patch 22 in the second antenna element. In the embodiment, the slot has a length $L_6$ of 2.2 mm to 2.6 mm and a width $W_6$ of 2.8 mm to 3.2 mm.

Preferably, a third monopole 7 and a third metallic post 15 loaded in the monopole as well as a seventh monopole 11 and a seventh metallic post 19 loaded in the monopole are symmetrically placed above the micro-strip patch 22 in the second antenna element. A fourth monopole 8 and a fourth metallic post 16 loaded in the monopole as well as an eighth monopole 12 and an eighth metallic post 20 loaded in the monopole are symmetrically placed below the micro-strip patch 22 in the second antenna element. In the embodiment, all monopole dimensions in the second antenna element are the same as those in the first antenna element. A distance $d_3$ from the third monopole 7 and the third metallic post 15 loaded in the monopole as well as the seventh monopole 11 and the seventh metallic post 19 loaded in the monopole to the upper edge of the micro-strip patch 22 in the second antenna element is 4 mm to 6 mm. A distance $d_4$ from the fourth monopole 8 and the fourth metallic post 16 loaded in the monopole as well as the eighth monopole 12 and the eighth metallic post 20 loaded in the monopole to the lower edge of the micro-strip patch 22 in the second antenna element is 4 mm to 6 mm. A distance $d_5$ from the center of the seventh metallic post 19 loaded in the monopole to the left side edge of the seventh monopole 11 is 2.1 mm to 2.5 mm. The micro-strip patch 22 in the second antenna element has a length $L_4$ of 24.8 mm to 25.2 mm and a width $W_4$ of 14.23 mm to 14.63 mm. A third stub 27 has a length $L_5$ of 1.8 mm to 2.2 mm and a width $W_5$ of 13.8 mm to 14.2 mm.

As shown in FIG. 4, the first antenna element and the second antenna element are connected by the filter phase-shift line 24 in an electric field plane direction to form a subarray. The substrate has a length $L_7$ of 63 mm to 67 mm and a width $W_7$ of 80 mm to 84 mm.

As shown in FIG. 5, the filter phase-shift line 24 comprises a first stub 25 which is arranged perpendicular to the upper edge of the substrate 1, a second stub 26 which is perpendicular to the first stub 25 and extends rightwards from the lower edge of the first stub 25, the third stub 27 which is perpendicular to the second stub 26 and extends downwards from the right side edge of the second stub 26, a fourth stub 28 which is perpendicular to the third stub 27 and extends to the left side from the middle part of the third stub 27, a seventh stub 31 which is perpendicular to the fourth stub 28 and extends downwards from the left side edge of the fourth stub 28, a fifth stub 29 which is perpendicular to the seventh stub 31 and extends to the right side from the seventh stub 31, and a sixth stub 30 which is perpendicular to the seventh stub 31 and extends to the right side from the seventh stub 31.

Preferably, the fourth stub 28, the fifth stub 29 and the sixth stub 30 are placed at equal intervals, and the fourth stub 28 has the same dimension as the fifth stub 29. In the embodiment, the first stub 25 has a length $L_8$ of 0.6 mm to 1 mm and a width $W_8$ of 11.85 mm to 12.25 mm. The second stub 26 has a length $L_9$ of 14.7 mm to 15.1 mm and a width $W_9$ of 0.6 mm to 1 mm. The third stub 27 has a length $L_{10}$ of 0.6 mm to 1 mm and a width $W_{10}$ of 5 mm to 5.4 mm. The fourth stub 28 has a length $L_{11}$ of 13.9 mm to 14.3 mm and a width $W_{11}$ of 0.6 mm to 1 mm. The fifth stub 29 has a length $L_{12}$ of 11.02 mm to 11.42 mm and a width $W_{12}$ of 0.2 mm to 0.6 mm. A distance $d_6$ between the lower edge of the fifth stub 29 and the upper edge of the sixth stub 30 is 0.2 mm to 0.6 mm. The seventh stub 31 has a length $L_{13}$ of 0.6 mm to 1 mm and a width $W_{13}$ of 13.05 mm to 13.45 mm.

After completing the above initial design, high-frequency electromagnetic simulation software HFSS is used for simulation analysis, and optimal dimensions of various parameters after simulation optimization are as shown in Table 1, where d represents the distance between two adjacent subarrays; $d_1$ represents the distance from the fifth monopole 9 in the first antenna element to the upper edge of the micro-strip patch 21 in the first antenna element; $d_2$ represents the distance from the sixth monopole 10 in the first antenna element to the lower edge of the micro-strip patch 21 in the first antenna element; $d_3$ represents the distance from the seventh monopole 11 in the second antenna element to the upper edge of the micro-strip patch 22 in the second antenna element; $d_4$ represents the distance from the eighth monopole 12 in the second antenna element to the lower edge of the micro-strip patch 22 in the second antenna element; $d_5$ represents the distance from the centers of the metallic posts in the first and second antenna elements to the left side edge of the monopole; $d_6$ represents the distance from the fifth stub 29 to the upper edge of the sixth stub 30; $L_1$ represents the length of the monopole; $L_2$ represents the length of the micro-patch in the first antenna element; $L_3$ represents the length of the micro-strip line in the first antenna element; $L_4$ represents the length of the micro-strip patch in the second antenna element; $L_5$ represents the length of the micro-strip line in the second antenna element; $L_6$ represents the length of the slot in the second antenna element; $L_7$ represents the length of the substrate in the subarray; $L_8$ represents the length of the first stub 25; $L_9$ represents the length of the second stub 26; $L_{10}$ represents the length of the third stub 27; $L_{11}$ represents the length of the fourth stub 28; $L_{12}$ represents the length of the fifth stub 29; $L_{13}$ represents the length of the seventh stub 31; $W_1$ represents the width of the monopole; $W_2$ represents the width of the micro-strip patch in the first antenna element; $W_3$ represents the width of the micro-strip line in the first antenna element; $W_4$ represents the width of the micro-strip patch in the second antenna element; $W_5$ represents the width of the micro-strip line in the second antenna element; $W_6$ represents the width of the slot in the second antenna element; $W_7$ represents the width of the substrate in the subarray; $W_8$ represents the width of the first stub 25; $W_9$ represents the width of the second stub 26; $W_{10}$ represents the width of the third stub 27; $W_{11}$ represents the width of the fourth stub 28; $W_{12}$ represents the width of the fifth stub 29; $W_{13}$ represents the width of the seventh stub 31; and D represents the diameter of the metallic post.

TABLE 1

Optimal dimensions of various parameters in the present disclosure

| Parameter | Dimension (mm) |
|---|---|
| d | 49 |
| $d_1$ | 5 |
| $d_2$ | 5 |
| $d_3$ | 5 |
| $d_4$ | 5 |
| $d_5$ | 2.3 |
| $L_1$ | 9.075 |
| $L_2$ | 25 |
| $L_3$ | 2 |
| $L_4$ | 25 |
| $L_5$ | 2 |
| $L_6$ | 2.4 |
| $L_7$ | 65 |
| $L_8$ | 0.8 |
| $L_9$ | 14.9 |
| $L_{10}$ | 0.8 |
| $L_{11}$ | 14.1 |
| $L_{12}$ | 11.22 |
| $L_{13}$ | 0.8 |
| $W_1$ | 2 |
| $W_2$ | 14.43 |
| $W_3$ | 7 |
| $W_4$ | 14.43 |
| $W_5$ | 14 |
| $W_6$ | 3 |
| $W_7$ | 82 |
| $W_8$ | 12.05 |

TABLE 1-continued

Optimal dimensions of various parameters in the present disclosure

| Parameter | Dimension (mm) |
| --- | --- |
| $W_9$ | 0.8 |
| $W_{10}$ | 5.2 |
| $W_{11}$ | 0.8 |
| $W_{12}$ | 0.4 |
| $W_{13}$ | 13.25 |
| D | 2.6 |

Figure 6:
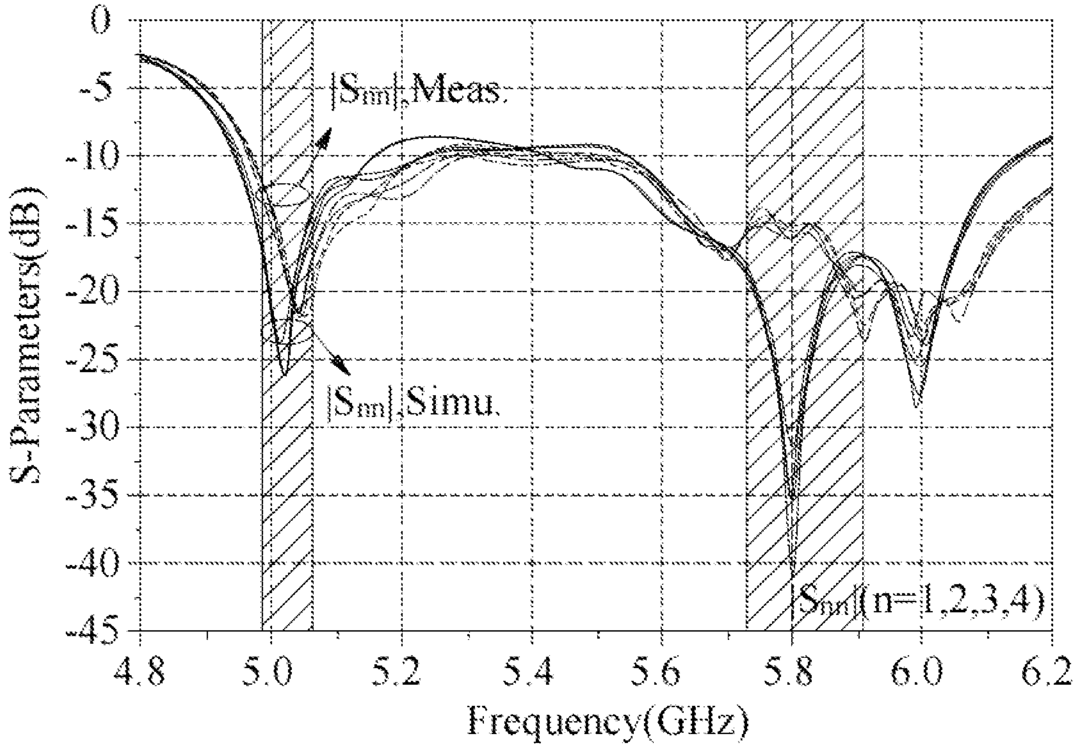
FIG. 6 is a curve of S parameters of various ports of the dual-band antenna array in accordance with the present disclosure.

In accordance with above parameters, the reflection coefficient characteristic parameters of the designed dual-band antenna array are simulated and tested using the HFSS, with analysis results as follows:

FIG. 6 illustrates simulation and test curves of the reflection coefficients $|S_{nn}|$ of various ports of the dual-frequency antenna array in accordance with the present disclosure. There is good agreement between the simulation result and the test result, and the test result indicates that the antenna is capable of generating two frequency bands at 5 GHz and 5.8 GHz, respectively.

Figure 7:
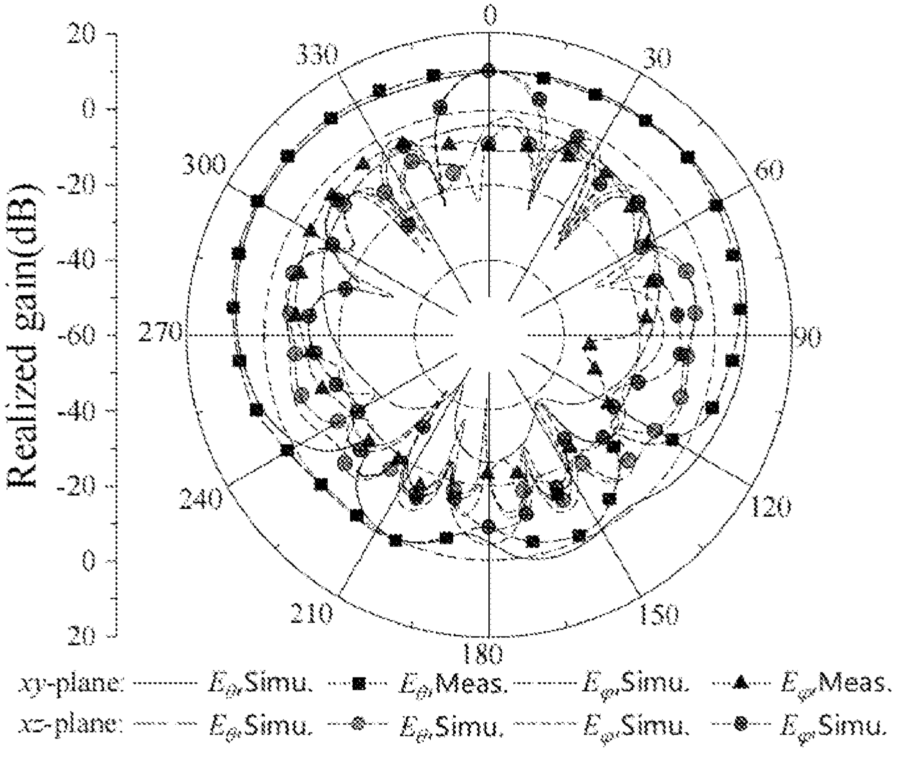
FIG. 7 is a radiation pattern of the dual-band antenna array with a wide beam in accordance with the present disclosure.

FIG. 7 illustrates radiation pattern characteristics of the dual-band antenna array at 5 GHz in accordance with the present disclosure. The test result indicates that the antenna has good performance characteristics of wide beam in an electric field plane direction to make signal coverage area wider, and is suitable for point-to-multiple communication.

Figure 8:
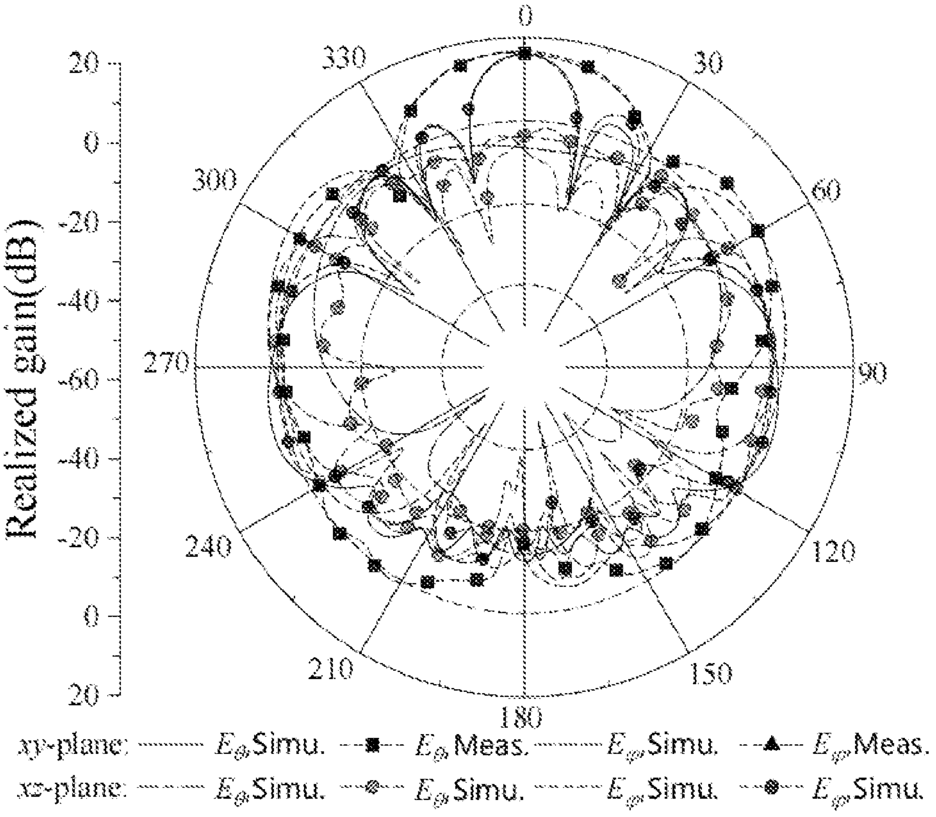
FIG. 8 is a radiation pattern of the dual-band antenna array with a narrow beam in accordance with the present disclosure.

FIG. 8 illustrates radiation pattern characteristics of the dual-band antenna array at 5.8 GHz in accordance with the present disclosure. The test result indicates that the antenna has good performance characteristics of narrow beam in the electric field plane direction, is high in antenna gain and capable of satisfying operating distance requirements for backhaul during point-to-point communication.

It should be noted that, the above embodiments are only for illustrating the technical solutions of the present disclosure, rather than limiting. Although the present disclosure is described in detail with reference to the embodiments, and it should be understood by those of ordinary skill in the art that any modifications or equivalent replacements made to the technical solutions of the present disclosure without departing from the spirit and scope of the technical schemes of the invention should be covered by the claims of the present disclosure.

What is claimed is:

1. A dual-band antenna array with both fan beam and pencil beam, wherein:

the dual-band antenna array is arranged on the upper surface of a substrate (1);

the dual-band antenna array comprises four subarrays arranged in a y-axis direction, with adjacent subarrays spaced at the same distance; and each of the subarrays is composed of a first antenna element and a second antenna element which are cascaded in an x-axis direction by a filter phase-shift line (24);

wherein the dual-band antenna array further comprises two pairs of T-shaped monopoles, that is, a first monopole (5) and a first metallic post (13) loaded in the monopole as well as a fifth monopole (9) and a fifth metallic post (17) loaded in the monopole are symmetrically placed at the upper side of a micro-strip patch (21), respectively;

wherein the dual-band antenna array further comprises two pairs of T-shaped monopoles, that is, a second monopole (6) and a second metallic post (14) loaded in the monopole as well as a sixth monopole (10) and a sixth metallic post (18) loaded in the monopole are symmetrically placed at the lower side of a micro-strip patch (21) in the first antenna element, respectively; and wherein the dual-band antenna array further comprises two pairs of T-shaped monopoles, that is, a third monopole (7) and a third metallic post (15) loaded in the monopole as well as a seventh monopole (11) and a seventh metallic post (19) loaded in the monopole are symmetrically placed at the upper side of a micro-strip patch (22) in the second antenna element.

2. The dual-band antenna array with both fan beam and pencil beam according to claim 1, wherein the dual-band antenna array further comprises two pairs of T-shaped monopoles, that is, a fourth monopole (8) and a fourth metallic post (16) loaded in the monopole as well as an eighth monopole (12) and an eighth metallic post (20) loaded in the monopole are symmetrically placed at the lower side of the micro-strip patch (22) in the second antenna element; and a slot (23) etched in the second antenna element is etched on the upper edge of the micro-strip patch (22) in the second antenna element.

3. The dual-band antenna array with both fan beam and pencil beam according to claim 2, wherein the filter phase-shift line (24) is formed by bending and connecting seven stubs.

4. The dual-band antenna array with both fan beam and pencil beam according to claim 1, wherein the substrate (1) is made of F4B, with a dielectric constant of 2.2, a loss tangent of 0.0009, and a thickness of 3 mm.

* * * * *